US006776176B1

United States Patent
Kino (12) United States Patent
(10) Patent No.: US 6,776,176 B1
(45) Date of Patent: Aug. 17, 2004

(54) APPLICATIONS OF ACOUSTIC WAVES IN DATA STORAGE DEVICES

(75) Inventor: Gordon S. Kino, Stanford, CA (US)

(73) Assignee: TeraStor Corporation, Milpitas, CA (US)

( * ) Notice: Subject to any disclaimer, the term of this patent is extended or adjusted under 35 U.S.C. 154(b) by 0 days.

(21) Appl. No.: 09/580,328

(22) Filed: May 26, 2000

(51) Int. Cl.[7] .................................................. B08B 7/00
(52) U.S. Cl. ........................................ 134/184; 369/71
(58) Field of Search ..................... 134/184; 369/53.1, 369/52.1, 71, 300; 367/157, 189, 190

(56) References Cited

U.S. PATENT DOCUMENTS

| 4,862,440 A | * 8/1989 | Miyamoto et al. ............ 369/45 |
| 6,084,743 A | * 7/2000 | Comstock et al. ....... 360/97.02 |
| 6,292,323 B1 | * 9/2001 | Tanaka et al. ................ 360/75 |
| 6,307,832 B1 | * 10/2001 | Novotny et al. ............ 369/300 |
| 6,339,517 B1 | * 1/2002 | Cheong ...................... 360/128 |
| 6,625,110 B2 | * 9/2003 | Kim et al. ................... 369/300 |

FOREIGN PATENT DOCUMENTS

| JP | 61294646 A | * 12/1986 | ........... G11B/7/135 |
| JP | 63183636 A | * 7/1988 | ........... G11B/7/135 |
| JP | 06028635 A | * 2/1994 | ............ G11B/5/41 |

OTHER PUBLICATIONS

Kolomenskii et al.; *Interaction of laser–generated surface acoustic pulses with fine particles: Surface cleaning and adhesion studies*; Sep. 1, 1998; Journal of Applied Physics, vol. 84, No. 5.

* cited by examiner

*Primary Examiner*—Alexander Markoff
(74) *Attorney, Agent, or Firm*—Fish & Richardson P.C.

(57) ABSTRACT

Devices and methods for using surface or acoustic waves in a recording head to prevent particles from settling down on an interfacing surface on the head.

20 Claims, 8 Drawing Sheets

| FINGER PAIR | r(μm) | THETA | x(μm) | y(μm) |
|---|---|---|---|---|
| 1.0000 | 140.00 | 0.056100 | 139.78 | 7.8499 |
| 2.0000 | 153.20 | 0.13015 | 151.90 | 19.883 |
| 3.0000 | 166.40 | 0.20420 | 162.94 | 33.744 |
| 4.0000 | 179.60 | 0.27826 | 172.69 | 49.332 |
| 5.0000 | 192.80 | 0.35231 | 180.96 | 66.528 |
| 6.0000 | 206.00 | 0.42636 | 187.56 | 85.193 |
| 7.0000 | 219.20 | 0.50041 | 192.32 | 105.17 |
| 8.0000 | 232.40 | 0.57446 | 195.10 | 126.28 |
| 9.0000 | 245.60 | 0.64851 | 195.74 | 148.34 |
| 10.000 | 258.80 | 0.72257 | 194.13 | 171.15 |
| 11.000 | 272.00 | 0.79662 | 190.16 | 194.48 |
| 12.000 | 285.20 | 0.87067 | 183.76 | 218.11 |
| 13.000 | 298.40 | 0.94472 | 174.85 | 241.80 |
| 14.000 | 311.60 | 1.0188 | 163.41 | 265.32 |
| 15.000 | 324.80 | 1.0928 | 149.40 | 288.40 |
| 16.000 | 338.00 | 1.1669 | 132.84 | 310.80 |
| 17.000 | 351.20 | 1.2409 | 113.76 | 332.27 |
| 18.000 | 364.40 | 1.3150 | 92.206 | 352.54 |
| 19.000 | 377.60 | 1.3890 | 68.257 | 371.38 |
| 20.000 | 390.80 | 1.4631 | 42.012 | 388.54 |
| 21.000 | 404.00 | 1.5371 | 13.596 | 403.77 |

Tapered Transducer at z = 0
FIG. 8A

Tapered Transducer at z = -32 μm
FIG. 8B

APPLICATIONS OF ACOUSTIC WAVES IN DATA STORAGE DEVICES

BACKGROUND

This specification relates to using acoustic waves in cleaning and sensing applications, and more particularly, to using acoustic waves for cleaning and sensing in data storage devices and systems.

Surface adhesion can attach fine particles to a surface. Such adhered particles may cause adverse effects and hence can be undesirable in certain applications. For example, adhered particles on a semiconductor wafer can degrade the performance and liability of integrated circuits fabricated on the wafer. Such surface-adhered particles can also cause problems in manufacturing masks for photolithography.

Acoustic waves have been used to remove surface-adhered particles from surfaces. In one implementation, a semiconductor wafer is immersed in a liquid and ultrasonic waves are generated to detach the adhered particles from the wafer surface into the liquid. In another implementation, laser pulses are used to impact on a surface to produce surface acoustic waves ("SAWs") on the surface. The generated surface acoustic waves produce a force on an attached particle that is greater than the adhesive surface bonding force, to detach the particle from the surface.

SUMMARY

The techniques and devices of the present disclosure use acoustic waves to reduce the amount of surface-adhered particles on a head that couples energy to a medium surface. Such particles may adversely affect the operations of a device using such a head by, among other things, distorting signals that are coupled between the head and the medium surface.

A device according to one embodiment includes a head having an interfacing surface that faces a medium surface and an acoustic transducer engaged to the head. The head is designed to couple energy from the interfacing surface to the medium surface. The head can be configured to couple any one type or a combination of different types of energy to the medium surface. For example, the head may be an optical head that couples optical waves. The head may also be a magnetic head that interacts with the medium surface through magnetic coupling. Furthermore, the head may be a hybrid head to interact with the medium surface by both optical and magnetic signals.

The acoustic transducer generates an acoustic wave that propagates to at least a portion of the interfacing surface to reduce particles adhered thereon. The acoustic wave may be a surface wave or a bulk wave. The acoustic transducer for generating surface acoustic waves may include a layer of piezo-electric material and a layer of transducer electrodes formed on the piezo layer. The transducer electrodes are electrically excited to cause the piezo layer to generate the acoustic waves.

These and other aspects and associated advantages will become more apparent in light of the detailed description, the accompanying drawings, and the appended claims.

DETAILED DESCRIPTION

Many data storage systems use a head to read data or write data on a storage medium by coupling energy between an interfacing surface of the head and the storage medium. This coupling by the interfacing surface of the head can be used to transfer data between the head and the storage medium, or other information such as tracking signals of the storage medium. Contamination on the interfacing surface of the head, such as surface-adhered particles, can distort each coupled signal by, for example, introducing noise, and changing the signal amplitude or phase. When the amount of contamination exceeds some threshold beyond the tolerance, the distortion can cause loss of data or even malfunction of the system.

Contaminants on the interfacing surface of the head may include fine solid particles and liquid droplets. The environment in which the device is placed may contribute to the contamination. Contaminants on the surface of the storage medium may transfer to the head during operation, especially when the medium is the removable type and hence is exposed to contamination by users and other sources.

Contamination of the interfacing surface of the head may also cause permanent damages to the head or the storage medium. For example, the interfacing surface may be an optical surface in an optical head through which optical signals are coupled. The light absorption by the contaminants on the interfacing surface may cause physical or chemical reactions to "bake" the contaminants on the optical interfacing surface. In addition to the signal distortion, such baked contaminants may scratch the storage medium or other parts of the interfacing surface when the optical head is in close proximity of or in contact with the storage medium. Similar damage can occur in a magnetic disk drive when the magnetic head is close to or in contact with the storage medium. Heating on the magnetic head may be caused by the friction between the magnetic head and the medium.

Contaminants on the interfacing surface are particularly problematic in an optical near-field storage system in which at least one portion of the energy coupled between the head and the storage medium is achieved by optical evanescent fields. The head, which may include a mechanism to couple magnetic or other signals, has an optical interfacing surface separated away from the storage medium by an air gap less than one wavelength of the coupled optical signal, e.g., about 100 nm or less. In addition to the above undesired effects, contaminants on the optical interfacing surface may fill the air gap and hence change the near-field configuration for evanescent coupling.

One aspect of the present techniques and devices is to apply an acoustic wave on the interfacing surface of the head to remove adhered particles from the interfacing surface and to prevent other particles from settling on the interfacing surface. The acoustic wave causes the interfacing surface to vibrate at the acoustic frequency to produce a force on an adhered particle. When the power of the acoustic wave is sufficient large, the particle can be removed from the interfacing surface when the force due to particle acceleration by the acoustic wave is greater than the adhesive force.

Figure 1:
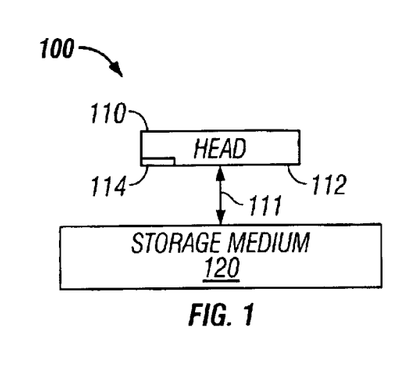
FIG. 1 is a schematic showing one embodiment of a head in a data storage device that implements an acoustic transducer.

FIG. 1 shows a data storage device 100 that implements an acoustic transducer 114 in a head 110 that reads or writes data on a storage medium 120. The head 110, which may be optical, magnetic, or other types, includes an interfacing surface 112 that couples a signal 111 from or to the storage medium 120 to retrieve or to record data. The acoustic transducer 114 as shown is directly located on the interfacing surface 112 to produce a desired acoustic wave on the surface 112. The acoustic transducer 114 may be alternatively positioned elsewhere on the head 110 that is adjacent to the interfacing surface 112 so long as the acoustic transducer 114 is acoustically coupled to deliver the acoustic wave to the interfacing surface 112.

It has been established that the normal component an of acceleration required to break a spherical particle loose from a surface is:

$$a_n > \frac{A}{2\pi \rho d^2 z_0^2}, \tag{1}$$

where A is the Hamaker constant, $\rho$ is the density of the particle, d is the diameter of the particle, and $z_0$ is the separation distance between the particle and the surface. See, Kolomenskii et al., "Interaction of laser generated surface acoustic pulses with fine particles: Surface cleaning and adhesion studies," Journal of Applied Physics, Vol. 84, pp. 2404–2410 (1998). The estimated value of an for a particle of 100 nm (0.1 micron) in diameter is $$a_n \approx 4.5 \times 10^8 g$$

for A=4 Å where g is the gravitational acceleration constant. Particles on the order of 100 nm or less are of particular interest because the air gap between the interfacing surface and the medium for certain near-field optical disk drives is on the order of 100 nm. The required tangential component of the acceleration is about the same magnitude as the normal component. The above value of acceleration sets a crude estimate for the required acoustic power at a location where the particles are to be removed.

For surface-bounded Rayleigh acoustic waves, the normal surface velocity $v_n$, the normal acceleration $a_n$, and associated surface displacement $u_n$ are respectively given by:

$$v_n = \left(\frac{f_y}{\rho V_s^2} \frac{\omega P}{w}\right)^{1/2}, \tag{2}$$

$$a_n = \omega v_n = \left(\frac{f_y}{\rho V_s^2} \frac{\omega^3 P}{w}\right)^{1/2}, \tag{3}$$

$$u_n = v_n / \omega = \left(\frac{f_y}{\rho V_s^2} \frac{P}{\omega w}\right)^{1/2}, \tag{4}$$

where $f_y$ is a parameter as a function of a ratio between the shear wave velocity $V_S$ and the longitudinal wave velocity $V_L$, w is the width of the acoustic beam, P is the acoustic power, and $\omega$ is the radian acoustic frequency defined by the acoustic frequency f as $\omega = 2\pi f$. The surface acceleration and associated displacement along the surface can also be calculated with equations similar to Equations (3) and (4) with a different coefficient $f_z$ to replace $f_y$. See, Auld, Acoustic Fields and Waves in Solids Vol. II, Wiley Publishing (1973).

Hence, the acoustic-induced acceleration of a surface-adhered particle is approximately proportional to $f^{3/2}$, where f is the frequency of the acoustic wave. Since the acoustic-induced force is proportional to this acceleration, it is desirable to set the acoustic frequency f high, e.g., in the UHF range, so that the acoustic force is greater than the surface adhesive force. However, the acoustic frequency may be limited below an upper limit to avoid significant attenuation of the acoustic wave.

The acoustic frequency f may also be subject to a lower limit in certain storage devices. As indicated above, the vertical acoustic displacement of the interfacing surface is approximately proportional to $1/f^{1/2}$. Hence, the vertical displacement increases as the acoustic frequency f decreases. In a near-field optical drive or in other drives where the interfacing surface is closely spaced from the storage medium, the acoustic displacement may be kept below a certain value so that the displacement does not cause the interfacing surface to contact the medium surface when such medium-head contact is undesirable. This requirement may set a lower limit to the acoustic frequency f.

However, the acoustic frequency f may be purposely set at a low value to cause the contact between the head and the medium, when so desired, to rub off contamination particles from the interfacing surface of the head. For example, the acoustic frequency may be modulated between a low frequency at which the head contacts the medium and a high frequency at which the head does not contact the medium. In this mode, the head essentially taps the medium at the rate of the modulation to keep the head clean.

As a numerical example, assume that the interfacing surface is formed of Schott LASF-35 glass which has a density $\rho = 5.41 \times 10^3$ kg/m$^3$, a Poisson's ratio $v = 0.303$, and a Young's modulus $E = 1.32 \times 10^{11}$ kg/m$^2$. Various parameters can be calculated: $V_S \approx 2.91$ km/s and $V_L 5.47$ km/s. The Rayleigh wave velocity in the glass $V_R$ (Glass)$\approx 2.71$ km/s. The surface wave velocity parameters, $f_y \approx 0.27$ and $f_z \approx 0.6$. Hence, for an acoustic frequency at 200 MHz, the Rayleigh wavelength is $\lambda_R \approx 13.5$ microns. If a piezoelectric layer ZnO is formed over the glass surface to generate the acoustic wave, the Rayleigh velocity is $V_R$ (ZnO)$\approx 3.2$ km/s and the respective Rayleigh wavelength is $\lambda_R$ (ZnO)$\approx 1.6$ microns. Therefore, when beam width w=40 microns and P=50 mW, the values of $a_n$ and the associated displacement $u_n$ are $a_n \approx 5.7 \times 10^9$ m/s, $u_n \approx 3.6$ nm. The acoustic Mach number based on the above parameters is $M = v_n / V_S = 0.0015$. Therefore, the acoustic-generated normal acceleration $a_n$ is about $5.82 \times 10^8 g$, satisfying the Kolomenskii estimated normal surface acceleration for removing a spherical particle of 0.1 micron in diameter. In actual implementation, the required acoustic power may be higher than the estimated value due to dissipation and loss during transmission from the acoustic transducer to the targeted location on the interfacing surface of the optical head.

The acoustic wave on the interfacing surface may be turned on when or even before the storage device is on. The acoustic wave may be continuous or pulsed with a high repetition rate to prevent particles from settling down. This is because the Van de Waals force on a particle settled on the surface tends to be greater than the force when the particle initially comes into contact, especially if the particle is less than 100 nm in size.

Figure 2:
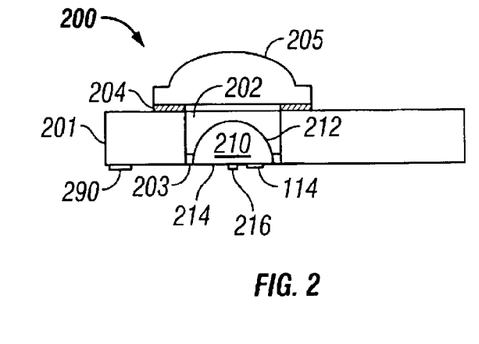
FIG. 2 is a schematic showing one embodiment of an optical head having an acoustic transducer.

FIG. 2 shows an optical head 200 as one implementation of the head 110 of the system 100 in FIG. 1. This optical head 200 includes a substrate 201 that has a through hole 202 for placing a solid immersion lens 210. The solid immersion lens 210 has a spherical surface 212 and an opposing flat surface 214. The lens 210 may be a hemispherical lens as shown or a super hemispherical lens where the flat surface 214 is more than one radius from the apex of the spherical surface 212. The lens 210 can be engaged to the substrate 201 within the hole 202 by, e.g., bond joints 203. Another lens 205 is attached to the substrate 201 by, e.g., bond joints 204 over the hole 202, to function as an objective lens. This objective lens 205 focuses an input optical beam to the lens 210.

In the near-field configuration, the objective lens 205 and the solid immersion lens 210 are structured and positioned to form a combination lens to have an effective numerical aperture greater than one. This is beyond the numerical aperture of conventional lens systems due to the diffraction limit. Hence, certain light rays coupled from the spherical surface 212 to the flat surface 214 may be incident to the flat surface 214 at angles greater than the critical angle and are thus totally reflected. Such internally totally reflected rays can be coupled to the medium via evanescent fields. The flat surface 214 of the lens 210 should be spaced from the storage medium by less than one wavelength of the optical beam to allow otherwise totally-reflected rays at the flat surface 214 to be evanescently coupled through the air gap. Such evanescent coupling can be used to achieve a focused spot size smaller than the minimum spot size set by the diffraction limit in air. The flat surface 214 of the lens 210 functions as the interfacing surface to a storage medium.

The acoustic transducer 114 may be positioned on or near the surface 214 at a location that is clear of the path of the optical signals to launch surface acoustic waves. If a magnetic field is not needed for the head operation, e.g., in disk drives for phase change disks, the acoustic waves can be directly sent to the desired interfacing region which the optical beam passes through. In a magneto-optic system where a magnetic field is needed, an optically transparent mesa 216 with a flat optical surface may be formed over the flat surface 214 to couple the optical signal. A coil and a layer of material with a high magnetic permeability can be formed around the mesa 216 to produce the desired magnetic field. The flat optical surface on the mesa 216 replaces the flat surface 214 of the SIL 210 to function as the interfacing surface. The surface acoustic wave on the flat surface 214 cannot directly reach the interfacing region but must transmit through the coil structure to reach the mesa 216 and hence the mesa surface.

In one implementation, the acoustic transducer 114 may include a thin film of titanium-gold or other metal followed by a layer of piezoelectric material, such as zinc oxide, formed over the non-piezoelectric flat surface 214 and a transducer layer of interdigital electrodes formed on the piezoelectric material to produce surface acoustic waves. Interdigital electrodes include a first set of finger electrodes at a first electrical potential and a second set of finger electrodes at a second electrical potential. The finger electrodes of the two sets are interleaved and insulated from one another. A RF signal is then applied to the interdigital electrodes to excite the acoustic wave in the piezoelectric layer.

Figure 3:
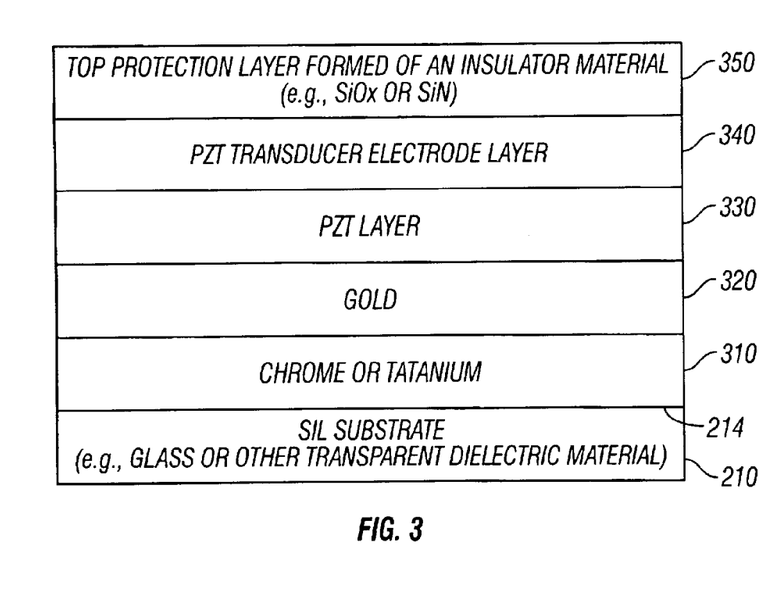
FIG. 3 shows one layer structure of a surface acoustic transducer.

FIG. 3 shows one exemplary layer structure of the acoustic transducer 114. An underlayer 310 formed of chrome or titanium is formed over the flat surface 214 over a region for the acoustic transducer 114. A gold layer 320 is then formed over the underlayer 310. A piezoelectric layer 330, such as ZnO, CdS, or LiNbO$_3$, is then formed over the gold layer 320. A transducer electrode layer 340 is then formed over the piezoelectric layer 330 and is patterned to have desired interdigital electrodes. A top protection layer 350 of an insulator material is then formed over the electrode layer 340 to prevent particles from being in direct contact with the interdigital electrodes and to prevent electrical breakdown. SiOx, SiN, and Al$_2$O$_3$, among other materials, may be used to form the protection layer 350.

The acoustic transducer is structured, in one aspect, to keep the driving electrical field on the electrodes as low as possible to produce the required acoustic power intensity at a target location on the interfacing surface of the recording head. This is in part to prevent electric field breakdown between the interdigital electrodes. One way to achieve this is to make the transducer area large so that the associated electrical impedance is low and the capacity of the transducer is high. By choosing the area correctly and using a large number of interdigital fingers, typically 15 to 25, a good match to the input circuit can be obtained. The large transducer area also keeps the acoustic intensity low in this region which reduces the possibility of electrode detachment caused by the acoustic vibrations.

In particular, the acoustic transducer keeps the acoustic intensity at the location of the transducer as low as possible to reduce loosening of the transducer electrodes while the acoustic intensity at the target location on the interfacing surface away from the transducer is as high as possible, to effectively make it less likely that particles will settle on the interfacing surface. Similar to optical focusing, the geometry of transducer electrodes may focus the acoustic wave, which has a relatively low intensity at the transducer, at the target location on the interfacing surface to a small spot so that the intensity is high. Both surface acoustic waves and bulk acoustic waves may be so focused.

Figure 4:
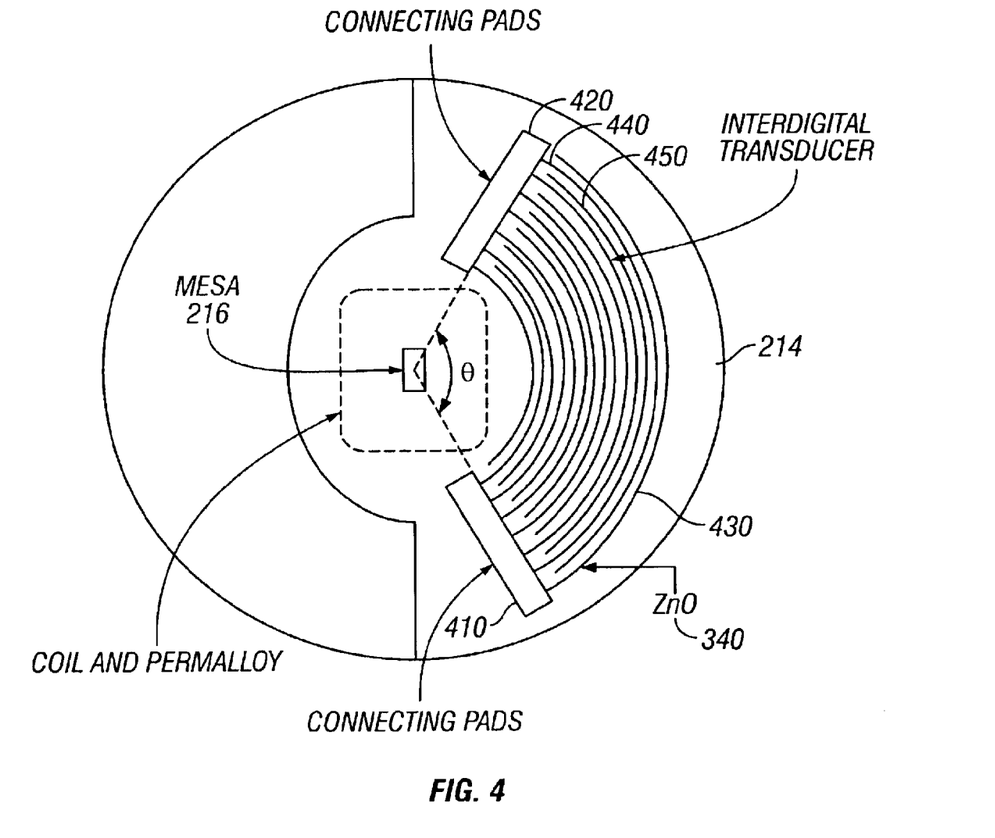
FIG. 4 shows one embodiment of a surface acoustic transducer with concentric interdigital electrodes.

FIG. 4 shows one exemplary design of the acoustic transducer 114 for the optical head 200 shown in FIG. 2. The interdigital electrodes form a concentric circular pattern as shown to focus the generated acoustic wave to a spot on the interfacing surface 214 through which the optical beam passes. The concentric circular interdigital electrodes can focus the acoustic beam to produce a high acoustic intensity at the region where particles to be removed from the surface 214. At the same time, the concentric circular interdigital electrodes can keep the acoustic intensity at a low level at the interdigital electrodes. This can substantially avoid loosening or even detaching the electrodes caused by the acoustic vibration. Moreover, since the acoustic beam can be tightly focused, the electrical fields that drive the interdigital electrodes can be set at sufficiently low values to reduce the probability of electrical breakdown.

The focus beam spot size d at the center of curvature of the concentric electrodes can be approximately determined by the geometry of the electrodes:

$$d = \frac{0.45\lambda}{\sin\left(\frac{\theta}{2}\right)} \quad (5)$$

where $\lambda$ is the acoustic wavelength in the non-piezo substrate and $\theta$ is the angle formed by the concentric electrodes at the center of curvature of the electrodes. For example, if $\lambda$ is 13.5 $\mu$m and $\theta$ is 120 degrees, then the focus spot size is about 7 $\mu$m. The actual focus spot size at the desired location on the interfacing surface, e.g., the mesa, can be controlled by changing the acoustic frequency and hence the acoustic wavelength, by changing the angle $\theta$, or by shifting the desired location out of the focus location.

The concentric electrodes are divided into two separate groups. One group is at a first electrical potential and the other is at a second electrical potential. These two separate groups are interleaved to form a plurality of pairs of electrodes. Each pair of electrodes, being biased at different potentials, applies a voltage over the piezoelectric layer 340 to excite the acoustic wave. Two conducting pads 410 and 420 are formed to receive a RF excitation signal and to apply the first and second electrical potentials to the first and second group of electrodes, respectively. Preferably the conducting pads 410 and 420 are excited with balanced potentials so that the underlying thin film 340a remains at ground potential. The electrode 430 is shown to connect to the pad 410 while its counter part electrode 440 is connected to the pad 420. This electrodes 430 and 440 form one pair of electrodes. Similarly, electrodes 450 and 440 are shown to form another pair of electrodes. The shape of the underlying piezoelectric layer 340 and underlying metal films 310 and 320 may conform to the shape of the circular pattern of the electrodes to reduce the acoustic loss due to refraction when the generated acoustic wave leaves the boundary of the acoustic transducer 114 to enter the flat surface 214. In general, the acoustic wave may be any type that causes the surface of the interfacing surface to vibrate in a direction perpendicular to the interfacing surface, including surface bounded acoustic waves such as Rayleigh waves and guided acoustic waves such as Lamb waves. For thin substrates with a thickness of several acoustic wavelengths, it is desirable to excite Rayleigh waves because of their small penetration depth on the order of one wavelength. Hence, the acoustic energy is concentrated near the surface to produce strong fields for effective removal of particles.

It is discovered that, if the acoustic field of the concentric transducer shown in FIG. 4 has an undesirable spatial pattern and the intensity of the acoustic field changes from one position to another.

Figure 5A:
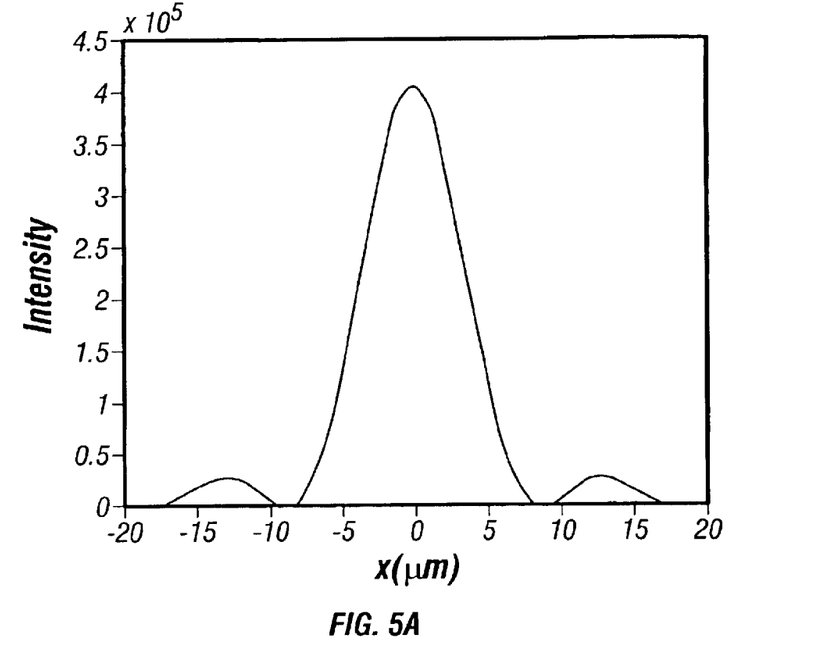
FIGS. 5A and 5B show the intensity spatial profiles at two different locations of the surface acoustic wave produced by the surface acoustic transducer shown in FIG. 4.

For example, along a symmetric axis z passing through the center of curvature, the intensity pattern at or near the focus point z=0 has Fresnel ripples along a direction x perpendicular to the z axis. FIG. 5A shows that the first zero point for the acoustic wave intensity occurs when x is slightly greater than 8 $\mu$m.

Figure 5B:
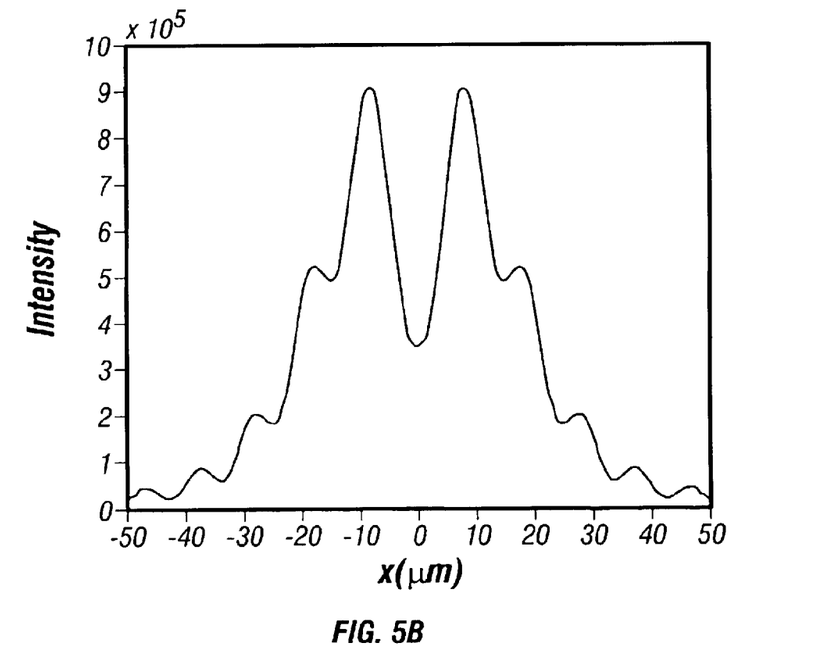

FIG. 5B shows the intensity pattern along the x axis when z=−32 $\mu$m, where the intensity has a dip at x=0 which is smaller than the center intensity at z=0, x=0 by a factor about 4.4. Such spatial variations in the intensity pattern may cause the acoustic wave intensities at certain spots on the interfacing surface of the head to be too low to achieve desired cleaning effects. In addition, the locations of the intensity nodes may even collect particles from surrounding non-node areas and hence worsen the local signal distortions.

One solution to this problem is to determine the spatial variation of the acoustic field and position the signal coupling region on the interfacing surface at a location where the acoustic field is sufficiently uniform or does not change significantly. However, in certain heads, the spatial variation may occur over a small region, such as several microns as in the examples shown in FIGS. 5A and 5B. This may impose a strict tolerance on the manufacturing misalignment which can be difficult to achieve. In addition, in certain optical heads, the coupled optical signals may need certain steering space on the interfacing surface for the tracking operation. The region in the acoustic field in which the intensity variation is acceptable may be too small to be useful for such beam steering.

Another solution is to design the geometrical shape of the concentric interdigital electrodes in a special way to reduce the spatial intensity variation of the acoustic field. In one embodiment, the length of each concentric electrode may be so controlled that the arc angle of each concentric electrode with respect to the common center of curvature is different from that of another concentric electrode. Hence, the contour formed by the ends of the interdigital electrodes on one side is no longer a straight line as shown in FIG. 4 but rather a curved line. It is discovered that, this "tapered" concentric interdigital transducer, when designed properly, can reduce the degree of the spatial variation of the respective acoustic field.

The arc angles of the concentric electrodes may be configured to vary with the radius of curvature of the electrodes according to a desired function. This function may be linear or nonlinear. A linearly tapered concentric interdigital transducer is described below as an example to illustrate the design method.

The arc angle of each interdigital electrode can linearly increase with its radius of curvature r by the following function:

$$r=140+13.2\ N\ (\mu m), \quad (6)$$

where N=1, 2, 3, . . . and N=1 represents the concentric electrode closest to the common center of curvature. The arc angle of the Nth concentric electrode, $\theta_0$, is:

$$\theta_0=(r-130)(\pi/2)/280. \quad (7)$$

If the concentric electrodes are still arranged symmetrically, the positions of ends of the electrodes at one side can be written as:

$$x=r\cos\theta_0,\ y=r\sin\theta_0. \quad (8)$$

Figure 6A:
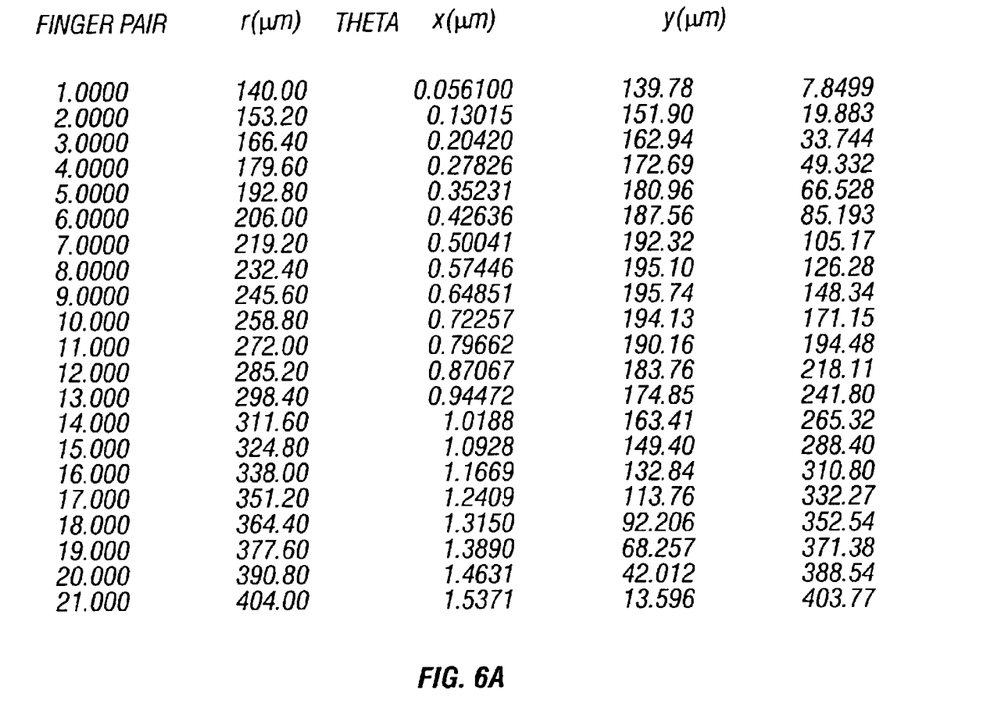
FIG. 6A shows a table of relative position values of ends of electrodes for a linearly tapered concentric interdigital transducer.
Figure 6B:
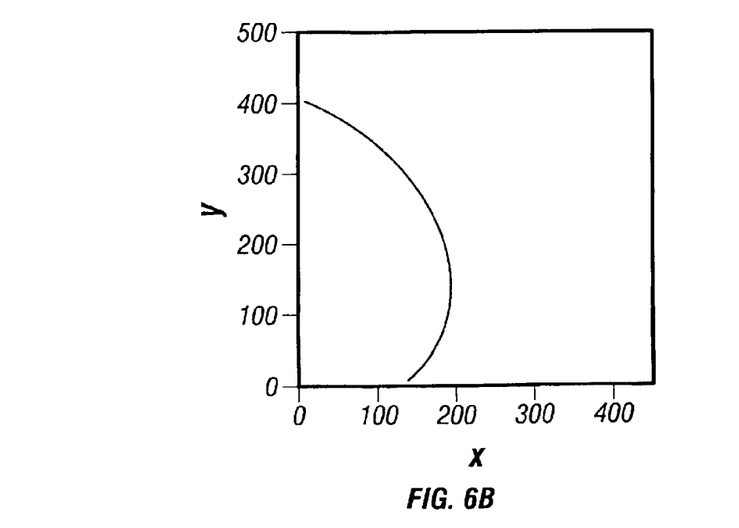
FIG. 6B shows the resultant shape on one side of the concentric transducer based on FIG. 6A.

FIG. 6A shows a table of the above x and y positions and FIG. 6B shows the resultant curved shape on one side of the concentric transducer.

Figure 7:
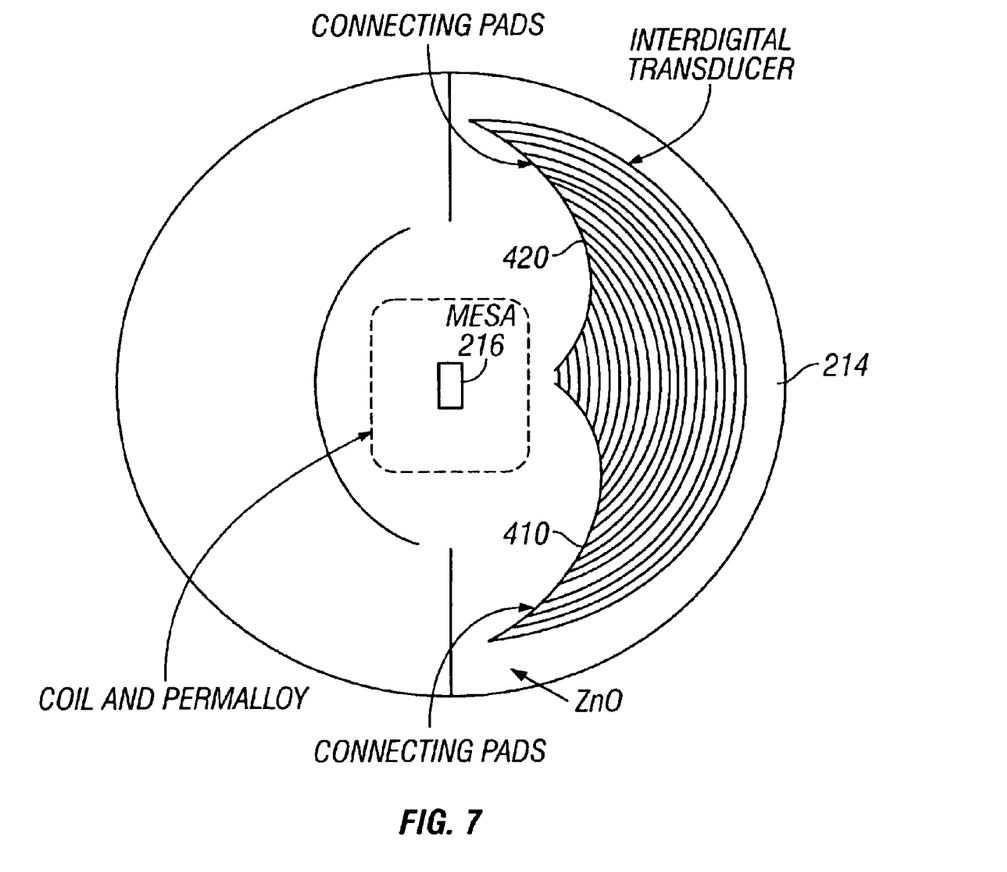
FIG. 7 shows a linearly tapered concentric transducer based on FIGS. 6A and 6B.
Figure 8A:
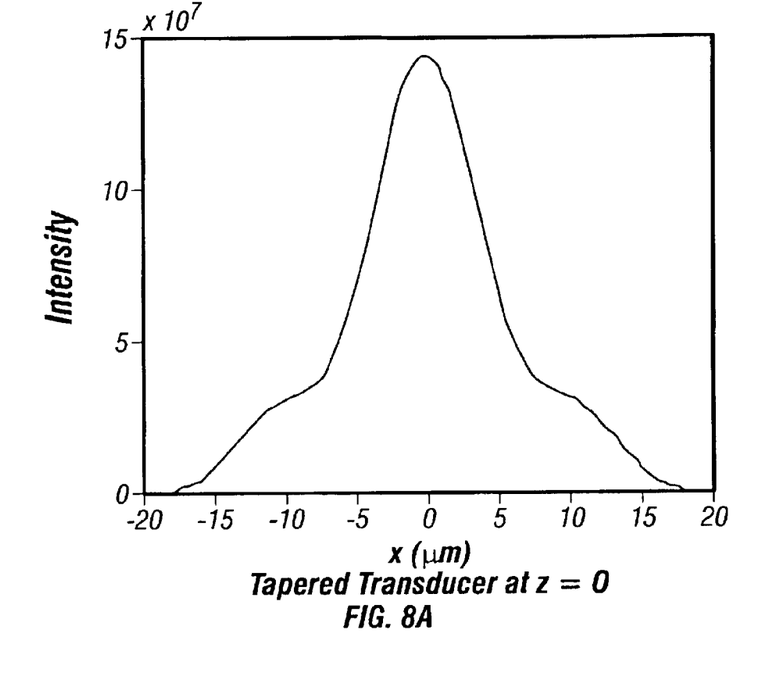
FIGS. 8A and 8B show the calculated intensity pattern of the acoustic field of the linearly tapered concentric interdigital transducer corresponding to the field positions respectively shown in FIGS. 5A and 5B.
Figure 8B:
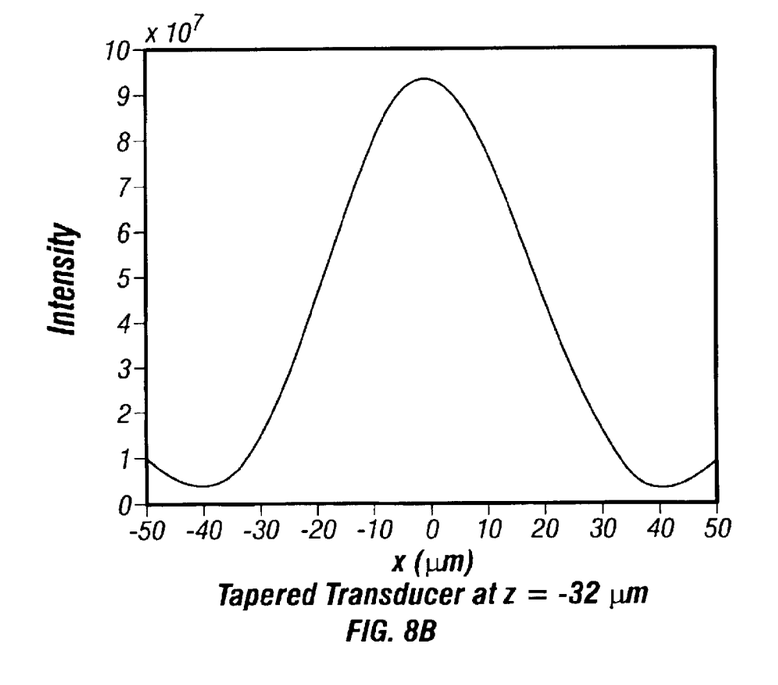
Figure 9:
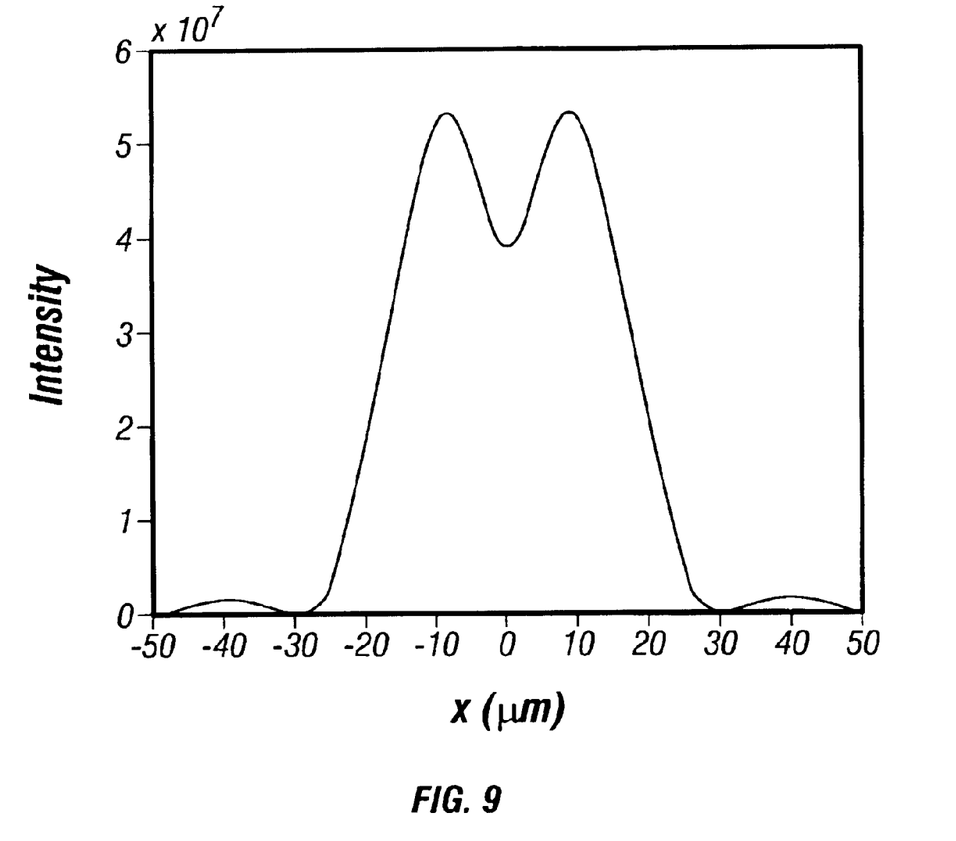
FIG. 9 shows a calculated intensity pattern of the acoustic field of the linearly tapered concentric interdigital transducer in FIG. 7 at a position with a dip.

FIG. 7 shows this linearly tapered concentric transducer. The conducting pads 410 and 420 may be shaped accordingly to match the curved shape of each end of the transducer. FIGS. 8A and 8B show the calculated intensity pattern of the acoustic field of this transducer corresponding to the field positions respectively shown in FIGS. 5A and 5B in an acoustic field from the untapered transducer in FIG. 4. The field pattern of the tapered transducer is similar to a Gaussian distribution at z=0 and z=−32 $\mu$m where the undesired Fresnel ripples are eliminated. However, some dips still exist at some positions as illustrated in an intensity distribution at z=15 $\mu$m in FIG. 9. These dips, however, are reduced compared to the intensity pattern of the untapered concentric transducer.

The above acoustic cleaning mechanism in a read or write head of a storage system may be extended from using a surface acoustic wave to using a bulk acoustic wave. Bulk acoustic waves may have certain advantages over the surface acoustic waves in certain applications where the region on the interfacing surface where the signals intersect may have structures interfering with propagation of the surface acoustic waves. For example, the interfacing surface may not be on the same plane with the surface acoustic transducer such as the mesa structure shown in FIG. 4, or there may be other elements formed between the surface acoustic transducer and the region of the interfacing surface to be cleaned such as a magnetic excitation coil in a magneto-optical head shown in FIG. 4. Hence, because the surface acoustic wave does not propagate along a continuous surface, any acoustic scattering and reflection at a discontinuous structure can attenuate the acoustic intensity at the desired location on the interfacing surface.

Propagation of bulk acoustic waves is usually not so limited under these circumstances because they can be transmitted to the interfacing surface in a bulk medium. Referring to FIG. 1, the element 114 may be replaced by a bulk acoustic transducer positioned at an appropriate location on the head 110 to produce a bulk acoustic wave which is focused on the interfacing surface 112. Such a focused bulk acoustic wave typically should be a longitudinal wave.

Figure 10:
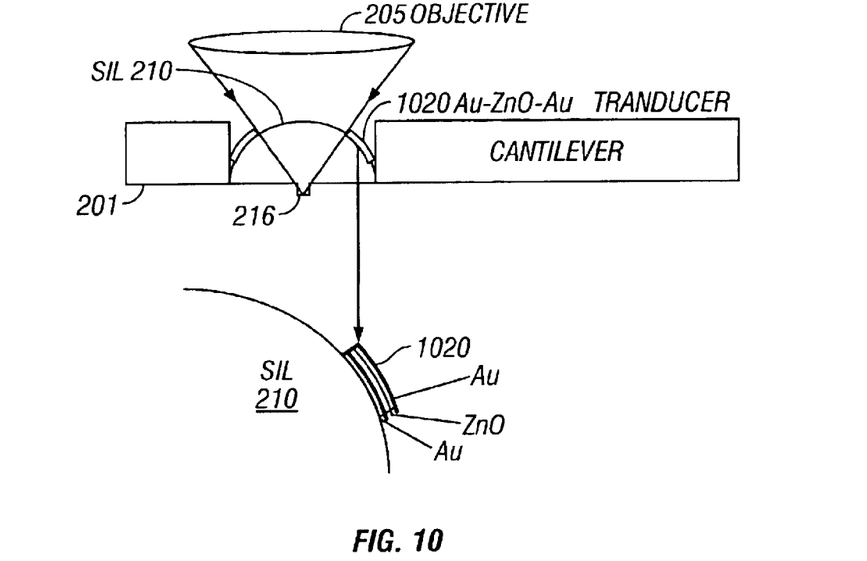
FIG. 10 shows an optical head with a bulk acoustic transducer formed on a spherical surface of a solid immersion lens.

FIG. 10 shows one embodiment of an optical head with a solid immersion lens 210 and a bulk acoustic transducer 1010. Here, the lens 210 may be a hemispherical lens which is positioned relative to the objective lens 205 so that the light rays from the objective lens 205 are substantially perpendicular to the spherical surface 212 and are focused near the center of the flat surface 214. Ideally the acoustic transducer required would be placed on top of the spherical surface 212 of the SIL 210. The acoustic wave would propagate through the SIL 210 and then be focused automatically near the center of the flat surface 214 on the mesa 216 where the optical beam is focused.

Since an acoustic transducer is usually not optically transparent, the transducer 1010 may be designed to have an opening in the central region of the spherical surface 212 to allow transmission of the optical beam. This can be implemented because the, optical beam from the objective lens 205 generally has a finite numerical aperture and occupies only the central portion of the spherical surface 212.

For example, if the numerical aperture of the objective 205 lens is 0.65, the maximum angle of the optical rays from the objective lens 205 to the SIL 210 is arcsin(0.65) or 41°. Thus, the transducer 1010 can be laid down on the peripheral region of the spherical surface 212 that is not occupied by the optical beam, i.e., in the angular range greater than 41°. This transducer 1010 may be a ring stripe covering a range from 41° to 60° on the peripheral region of the surface 212. Such a transducer can excite a hollow focused toroidal beam. The particle velocity v and an acceleration a at the focused point can be approximately expressed as $$v = v_0 J_0(2\pi r \sin(\theta_0)/\lambda)$$
$$a = \omega v_0 J_0(2\pi r \sin(\theta_0)/\lambda) \quad (9)$$

where $\lambda$ is the acoustic wavelength, $\omega$ is the radian frequency, $J_0(x)$ is a Bessel function of the first kind of zeroth order, $\theta_0$ is the average angle to the axis of the beam rays, i.e., about 50° in this example, and $v_0$ is the particle velocity on axis at the focus point.

It follows that the full width at half power of the acoustic spot, d, at the mesa 216 is approximately given by $$d = 0.36\lambda/\sin\theta_0 \quad (10)$$

Hence, if the power in the acoustic beam is P, the intensity of the beam, I, at the mesa 216 is approximately $$I = \frac{4P}{\pi d^2} = 9.8 \left(\frac{\sin\theta_0}{\lambda}\right)^2 P. \quad (11)$$

Assuming the acoustic frequency is about 200 MHz and that the SIL is made of Schott LASF-35 glass, the corresponding longitudinal wave velocity in the glass is about 5.47 km/s and the acoustic wavelength is about 27 $\mu$m. With $\theta_0=50°$, the acoustic spot size at the mesa 216 should be about 12.7 $\mu$m. The relation between intensity and velocity on axis is $$I = Z v_0^2/8 \quad (12)$$

where Z is the acoustic impedance, or $2.95 \times 10^7$ kg/m$^2$-s in this example. It has been assumed that the acoustic velocity is doubled because the wave is perfectly reflected at the glass-air interface at the flat surface 214. Hence, if the power in the beam is P=100 mW, the peak velocity at the mesa 216 is about 21 m/s and the acceleration is a $2.6\times10^{10}$ m/s$^2$, with a/g=$2.69\times10^9$ which is greater than the value of a/g=$4.5\times10^8$ required for removing an adhered spherical particle of 0.1 $\mu$m in diameter from the flat surface 214.

The transducer 1010 may be formed of a metal layer of TiAu laid down on the surface 212 of the SIL 210 as one electrode, a piezo layer of ZnO sputtered on to the Au layer, and another layer of gold used as another electrode. A RF driving voltage is applied to the two electrodes to produce the bulk acoustic waves in the ZnO layer.

The acoustic velocity in ZnO is approximately 6.33 km/s and the associated acoustic wavelength is about 31.6 $\mu$m at 200 MHz. Since the impedance of ZnO impedance (about $3.6\times10^7$ kg/m$^2$-s) is well match to the Schott LASF-35 glass, the transducer is broadband. It can be known that the peak radiation impedance is at a frequency where the piezoelectric layer is 0.37 wavelengths thick. See, G. S. Kino, *Acoustic Waves: Devices, Imaging, and Analog Signal Processing*, Prentice-Hall, Inc. 1987. In this example, the piezo layer is 11.7 $\mu$m thick, which is a relatively thick layer. The piezo layer may be chosen to be one quarter wavelength thinner than impedance-matching thickness, i.e., about 8 $\mu$m in this example, to reduce the layer thickness. The radiation impedance, $R_a$, is given by the relation:

$$R_a = \frac{3.6 k_T^2}{\pi^2 f_0 C_0}, \quad (13)$$

where $f_0$ is the acoustic frequency, $k_T=0.28$ is the piezoelectric coupling constant, and $C_0$ is the capacity of the transducer 1010. The area of the ring transducer 1010 is $$A = 2\pi(\theta_2 - \theta_1)\rho^2 \sin\theta_0, \quad (14)$$

where $\theta_1$ and $\theta_2$ are the inside and outside angle of the ring transducer 1010, respectively, and $\rho$ the radius of the spherical surface 212. Hence, A=$4.2\times10^{-7}$ m$^2$ for $\rho=500\mu$m. With $\epsilon/\epsilon_0=8.8$, the capacitance of the transducer is, therefore, 4.1 pf, with a reactance at 200 MHz of 194 ohms, and a radiation impedance of 35 ohms. The parameters in the above example may be used to implement the acoustic cleaning.

An acoustic wave generated in the above heads with a bulk or surface acoustic transducer may also be used to detect the contact between the head and the storage medium during operation, in addition to cleaning the interfacing surface of the head. When the head contacts a spinning storage disk, the acoustic perturbation caused by the contact can change the acoustic field in the head produced by the acoustic transducer. This perturbation includes, for example, the acoustic reflection from the contact point. The change in the acoustic field, if detected, can be used to determine whether the head is in contact or is in such close proximity to the storage disk that the acoustic field in the head is perturbed. An acoustic sensor or receiver may be placed at a suitable location in the head to monitor the acoustic field.

FIG. 2 shows such an acoustic sensor 290 formed on the bottom of slider 201 in the optical head 200. An electronic control circuit is connected to the acoustic transducer 114 and the sensor 290 to measure the acoustic change and hence to monitor the contact between the head 200 and the disk.

In an alternative embodiment, an acoustic reflector can be built in the acoustic sensor 290 so that the surface acoustic wave from the transducer 114 is reflected back to form a standing acoustic wave between the elements 290 and 114. The acoustic sensor 290 thus is used to monitor a change in the standing wave caused by the contact between the head 200 and the disk. The element 290 may be an acoustic reflector only and the acoustic transducer 114 may be designed to further function as a detector to measure the change.

In addition, a pulsed acoustic wave may be generated from the transducer for detection of the contact. The reflected pulse signal can be detected with a high sensitivity.

Although only a few embodiments are described, various modifications and enhancements may be made. For example, the above acoustic transducer can be implemented in optical disk drives in either far field or near field configuration. The head with the above acoustic mechanism may be types other than optical or magnetic type, such as a hybrid head that couples both magnetic and optical signals. The shape of the interdigital transducer may be of a shape different from the concentric circular geometry shown in FIGS. 4 and 7 to achieve desired focusing effects. In addition, the head with the acoustic mechanism may be used in a system other than data storage systems to couple energy to a surface. For example, the optical head 200 shown in FIG. 2 can be used for photo exposure in photolithography to achieve a high resolution.

Figure 11:
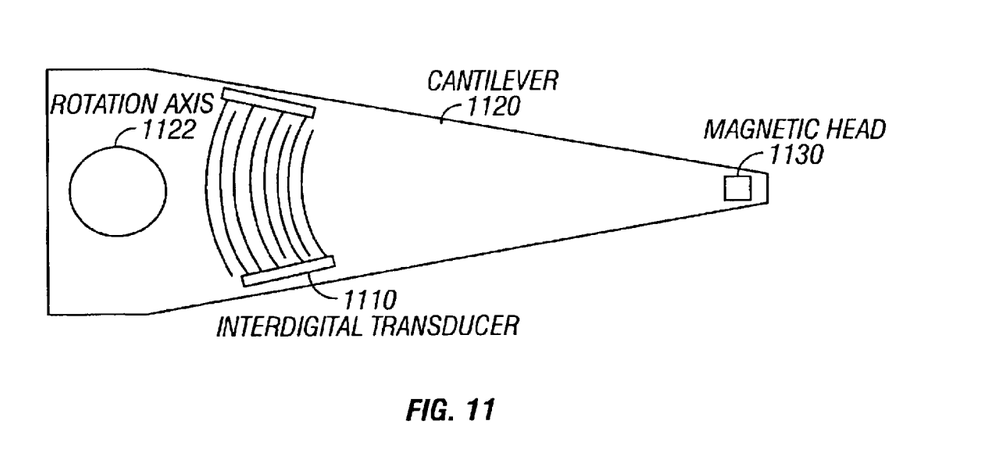
FIG. 11 shows one example of a disk drive having an acoustic transducer on its cantilever.

Furthermore, the above acoustic mechanism for removing contamination particles may also be implemented in magnetic hard disk drives, esspecially the removable types where contamination particles particularly problematic. An interdigital acoustic transducer can be formed on the cantilever of a hard disk drive, either on its top surface or its bottom surface facing the hard disk. The latter position might be preferable to avoid acoustic interaction with the electrical wires normally mounted on the top surface. FIG. 11 shows one example in which a concentric interdigital transducer 1110 is placed at a location on the cantilever 1120 rotating around an axis 1122. A recording head 1130, e.g., a magnetic head, is at a distal side on the cantilever 1120 where the acoustic wave is focused. The cantilever 1120 may be made of metal or other suitable materials. The acoustic transducer 1110 is formed by first depositing a thin film of TiAu to give alignment of the ZnO crystallites during deposition.

All these and other aspects are intended to be encompassed in the following claims.

What is claimed is:

1. A device, comprising:
    an optical head, having an interfacing surface that faces a medium surface, to couple optical energy through said interfacing surface to and from the medium surface; and
    an acoustic transducer, engaged to said optical head, to generate an acoustic wave that propagates to at least a portion of said interfacing surface.

2. The device as in claim 1, wherein said acoustic transducer is a type that generates a surface acoustic wave on said interfacing surface.

3. The device as in claim 2, wherein said acoustic transducer includes a piezoelectric layer and an interdigital electrode layer in contact with said piezoelectric layer.

4. The device as in claim 3, wherein said interdigital electrode layer includes concentric interdigital electrodes.

5. The device as in claim 4, wherein said interdigital electrodes have different arc angles with respect to a center of curvature common to said electrodes.

6. The device as in claim 2, wherein said acoustic transducer is engaged to said interfacing surface.

7. The device as in claim 6, further comprising an acoustic sensor engaged to said interfacing surface to detect a change in said acoustic wave.

8. The device as in claim 6, further comprising an acoustic reflector engaged to said interfacing surface to reflect said acoustic wave back to said acoustic transducer.

9. The device as in claim 1, wherein said acoustic transducer is a type that generates a bulk acoustic wave.

10. The device as in claim 1, further comprising an acoustic sensor engaged in said optical head at a position to detect a change in the acoustic field produced by said acoustic transducer.

11. The device as in claim 1, wherein said optical head has a structure to couple said optical energy via an evanescent field between said interfacing surface and the medium surface.

12. The device as in claim 1, wherein said optical head includes a solid immersion lens having a spherical surface to receive an optical beam and a flat surface to couple said optical beam to the medium surface.

13. The device as in claim 12, wherein said acoustic transducer is engaged to said spherical surface.

14. The device as in claim 12, wherein said acoustic transducer is engaged to said flat surface.

15. The device as in claim 14, wherein said acoustic transducer includes concentric circular interdigital electrodes to focus the acoustic wave to produce a high acoustic intensity at a region where a particle is to be removed from the device.

16. A system comprising an optical head, the optical head comprising:
    a substrate having a through hole for placing a solid immersion lens, the solid immersion lens having a spherical surface and an opposing flat surface, the opposing flat surface of the solid immersion lens being adapted to serve as an interfacing surface to a storage medium;
    an objective lens attached to the substrate and over the through hole, the objective lens being adapted to focus an optical beam into the solid immersion lens; and
    an acoustic transducer adapted to launch surface acoustic waves, the acoustic waves being directly sent to the interfacing surface which the optical beam passes through.

17. The system of claim 16, wherein the acoustic transducer is placed in a location that is clear of a path of the optical beam.

18. A system comprising:
    a solid immersion lens comprising a spherical surface;
    an acoustic transducer being placed on the spherical surface and adapted to generate and focus an acoustic wave through the solid immersion lens to an area of the solid immersion lens where an optical beam is focused to acoustically clean the area.

19. The system of claim 18, the solid immersion lens comprising a hemispherical lens being positioned relative to an objective lens, wherein a light ray from the objective lens are substantially perpendicular to the spherical surface.

20. The system of claim 18, wherein the acoustic transducer has an opening in a central region of the spherical surface to allow transmission of the optical beam.

* * * * *